United States Patent

Lloyd et al.

[11] Patent Number: 6,019,441
[45] Date of Patent: Feb. 1, 2000

[54] CURRENT CONTROL METHOD FOR A SOLENOID OPERATED FLUID CONTROL VALVE OF AN ANTILOCK BRAKING SYSTEM

[75] Inventors: Earl Wayne Lloyd, Lebanon; William Dale Cornwell, Beavercreek, both of Ohio

[73] Assignee: General Motors Corporation, Detroit, Mich.

[21] Appl. No.: 08/946,909

[22] Filed: Oct. 9, 1997

[51] Int. Cl.[7] .................................................. B60T 8/66
[52] U.S. Cl. .......................... 303/156; 303/157; 303/158; 303/119.2
[58] Field of Search ................................ 303/116.1, 156, 303/157, 158, 161, 119.2

[56] References Cited

U.S. PATENT DOCUMENTS

| | | | |
|---|---|---|---|
| 3,637,264 | 1/1972 | Leiber et al. | |
| 4,266,261 | 5/1981 | Streit et al. | 361/154 |
| 4,585,280 | 4/1986 | Leiber | 303/156 |
| 4,741,580 | 5/1988 | Matsubara et al. | 303/156 |
| 5,261,731 | 11/1993 | Yogo et al. | 303/116.1 |
| 5,347,419 | 9/1994 | Caron et al. | 361/154 |
| 5,600,237 | 2/1997 | Nippert | 324/207.16 |
| 5,645,097 | 7/1997 | Zechmann et al. | 137/1 |
| 5,823,640 | 10/1998 | Eichhorn et al. | 303/119.2 |
| 5,927,832 | 7/1999 | Fulks et al. | 303/167 |
| 5,948,036 | 9/1999 | Okubo | 701/78 |

FOREIGN PATENT DOCUMENTS

| | | |
|---|---|---|
| 0075657 | 4/1983 | WIPO. |
| WO94/10016 | 5/1994 | WIPO. |
| WO96/05992 | 2/1996 | WIPO. |

OTHER PUBLICATIONS

NASA SP–5948(01), Solenoid Valve Driver Circuit, col. 1 lines 3–18, Aug. 27, 1972.

*Primary Examiner*—Mark T. Le
*Assistant Examiner*—Daniel Yeagley
*Attorney, Agent, or Firm*—Robert M. Sigler

[57] ABSTRACT

The solenoid control valves of a solenoid-operated automotive antilock braking system are cyclically controlled to enable the valves to operate in a stable, partially open position that provides a desired fluid flow while minimizing noise associated with acceleration and deceleration of the controlled fluid. After an incipient lock-up condition is detected and the solenoid valve has been energized to hold and/or permit a partial release of the brake pressure, the solenoid is initially de-energized for a defined interval designed to reduce the current to a scheduled value. In this interval, the solenoid current is re-circulated through a free-wheeling diode for a smooth decay, allowing the valve to slowly open in a smooth and stable fashion. Then the solenoid is pulse-width modulated (PWM) at a frequency and duty cycle designed to maintain the solenoid current at the scheduled value. The interval of PWM is relatively brief to avoid any instability associated with the current pulsation. At this point, the solenoid is re-energized just long enough to reach its steady state value, thereby returning the valve to a closed or nearly closed position, and completing the current control cycle. The solenoid is then de-energized and the cycle is repeated, allowing the controller to smoothly return the brake pressure to the system pressure while minimizing any attendant hydro-mechanical noise.

10 Claims, 6 Drawing Sheets

CURRENT CONTROL METHOD FOR A SOLENOID OPERATED FLUID CONTROL VALVE OF AN ANTILOCK BRAKING SYSTEM

This invention relates to solenoid-operated antilock braking systems for motor vehicles, and more particularly to a current control method for minimizing hydro-mechanical noise produced by operation of the solenoid operated valves.

BACKGROUND OF THE INVENTION

In many solenoid-operated antilock braking systems, normally open fluid control valves (sometimes referred to as poppet valves) are connected in hydraulic lines coupling a hydraulic boost unit to each brake. The boost unit develops hydraulic pressure based on brake pedal pressure exerted by the driver, and a controller monitors wheel speeds to sense wheel lock-up. When an incipient lock-up condition is detected, the controller momentarily closes one or more of the valves to hold or reduce the respective brake pressure, and then quickly opens and closes the valves to progressively re-apply the boost pressure in a series of steps. The valves are cycled in this manner to maximize the hydraulic pressure applied to each brake while preventing lock-up.

The fluid control valves are typically mechanized with large diameter, on/off solenoid valves in order to satisfy the maximum flow requirements. In the re-apply phase of the control, the valves are quickly pulsed on and off to limit fluid flow. However, the pulsing of the valve repetitively accelerates and decelerates the fluid, producing hydraulic shock waves that can resonantly excite the brake lines and other elements of the system. This can unduly stress the system, and in severe cases, can result in audible noise sometimes referred to as "hammering".

One solution to the above-described problem is to replace the solenoid valves with linear control valves that can accurately position a valve pintle relative to its seat without repeated opening and closing of the valve. However, such valves cost considerably more than a simple poppet valve, and contribute to a system that is cost prohibitive.

SUMMARY OF THE PRESENT INVENTION

The present invention is directed to an improved current control method for the solenoid control valves of a solenoid-operated automotive anti-lock braking system. The valves are energized in accordance with a cyclic current control strategy that enables the valves to operate in a stable, partially open position that provides the desired fluid flow while minimizing noise associated with acceleration and deceleration of the controlled fluid. After an incipient lock-up condition is detected and the solenoid valve has been energized to hold and/or permit a partial release of the brake pressure, the ABS controller utilizes a novel current control method to re-apply the system brake pressure. The current control method allows the controller to control the position of the valve during the re-apply interval so that the brake pressure may be smoothly increased from an initial pressure to the higher system pressure. In the course of the re-apply interval, the average current supplied to the valve is gradually increased to achieve a desired rate of change of brake pressure. Stability of control is achieved by cyclically returning the valve to a closed or nearly closed position, and then reducing the current to a scheduled value to return the valve to a partially open position. The fluid perturbations caused by this cyclic movement of the valve are greatly reduced compared with the conventional on/off control described above, thereby minimizing the resulting hydro-mechanical noise.

In a preferred implementation of the current control method, the solenoid is de-energized for a defined interval at the beginning of the re-apply phase of the ABS control in order to reduce the current to a scheduled value corresponding to a desired fluid flow rate. In this interval, the solenoid current is re-circulated through a free-wheeling diode for a smooth decay, allowing the valve to slowly open in a smooth and stable fashion. Then the solenoid is pulse-width modulated (PWM) at a frequency and duty cycle chosen to maintain the solenoid current at the scheduled value. The interval of PWM is relatively brief to avoid any instability associated with the current and pressure pulsation. At this point, the solenoid is re-energized just long enough to reach its steady state value, thereby returning the valve to a substantially closed position, completing a current control cycle. The solenoid is then de-energized and PWMed as in the first cycle to control the current to a new scheduled value. This cycling is continued during the re-apply interval to smoothly return the brake pressure to the system pressure while minimizing any attendant hydro-mechanical noise.

In a preferred implementation, the current control method is carried out with a multi-modal microprocessor control which is the subject of a related co-pending U.S. patent application Ser. No. 08/XXX,XXX (Attorney Docket No. H-198,081), assigned to Delco Electronics Corporation. Such method includes a first control mode in which the solenoid is fully energized, a second control mode in which the solenoid is pulse-width-modulated, and a third control mode in which the solenoid is de-energized. The microprocessor performs the ABS algorithm and indicates the desired control mode by the logic level of a tri-state output port. In the first and third control modes, indicated by first and third logic levels, the energization state of the solenoid is controlled directly by the microprocessor output port. In the second control mode, indicated by a second logic level, the energization state of the solenoid is controlled by an external PWM circuit based on PWM commands supplied to the PWM circuit by the microprocessor. As a result, the microprocessor directly controls the on and off intervals of the solenoid, while it indirectly controls PWM of the solenoid via the external PWM circuit.

DETAILED DESCRIPTION OF THE DRAWINGS

Figure 1:
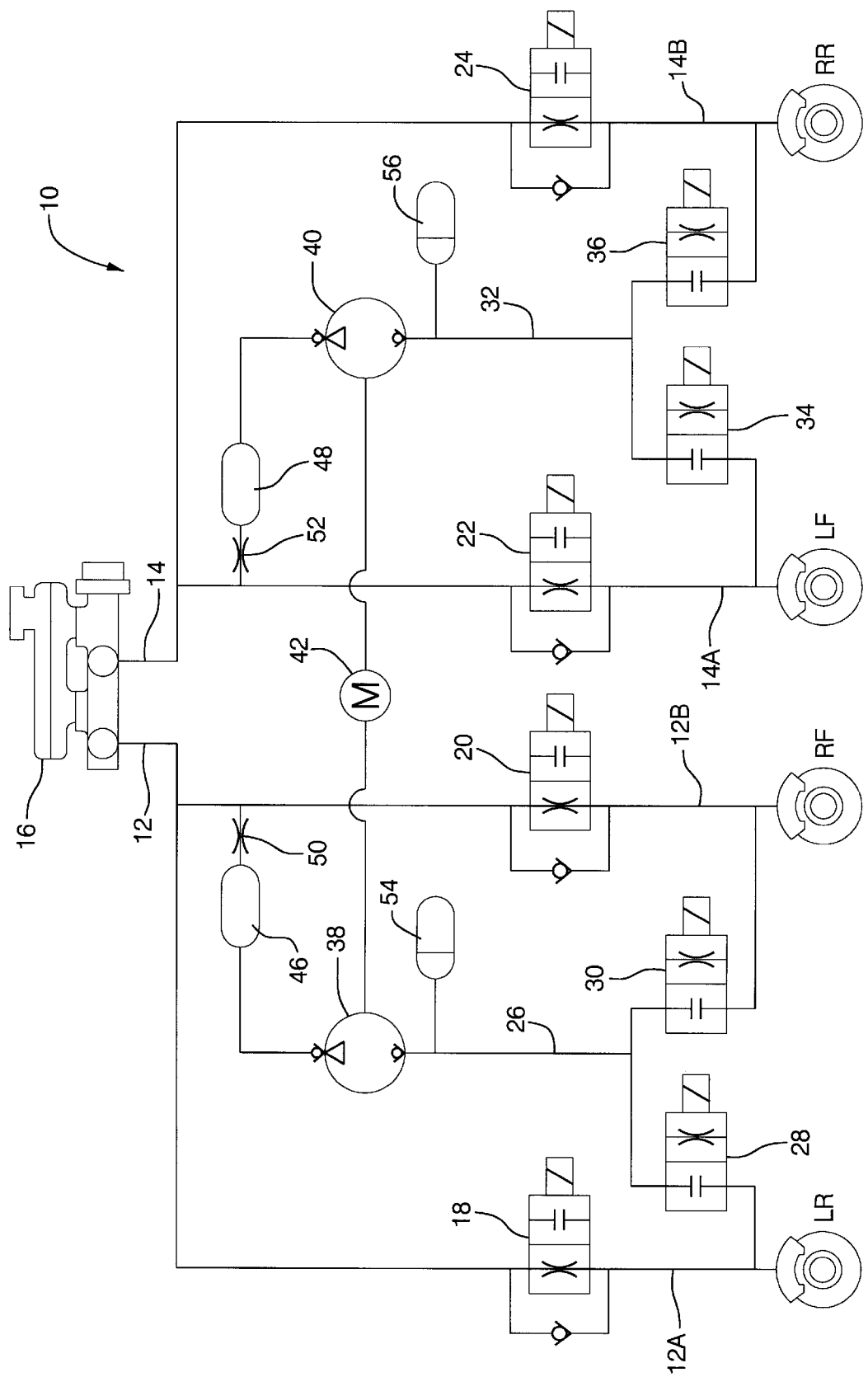
FIG. 1 is a hydraulic block diagram of an ABS system according to this invention.

Referring to the drawings, and particularly to FIG. 1, the reference numeral 10 generally designates the hydraulic and electro-hydraulic elements of a solenoid-operated automotive ABS system. Hydraulic braking pressure is developed in supply lines 12 and 14 by a conventional hydraulic boost unit 16 in relation to the force applied to an operator-manipulated brake pedal (not shown). The line 12 is coupled to the left-rear (LR) and right-front (RF) brakes of the vehicle via solenoid operated apply valves 18 and 20, respectively, and the line 14 is coupled to the left-front (LF) and right-rear (RR) brakes via solenoid-operated apply valves 22 and 24, respectively. Check valves connected in parallel with each of the apply valves 18, 20, 22 and 24 prevent the brake pressure from exceeding the pressure in the respective supply lines 12 and 14. This will be recognized as a diagonal braking system, although other mechanizations such as front-rear are also possible.

The hydraulic lines 12a and 12b intermediate the respective apply valves 18, 20 and brakes LR, RF are coupled to hydraulic line 26 via solenoid-operated release valves 28 and 30, respectively. Similarly, hydraulic lines 14a and 14b intermediate the respective apply valves 22, 24 and brakes LF, RR are coupled to hydraulic line 32 via solenoid-operated release valves 34 and 36, respectively. The lines 26 and 32 are connected to the inlets of pumps 38 and 40, which are operated by the electric motor 42 whenever ABS pressure control is in effect. The pumps 38 and 40 return fluid in lines 26 and 32 to fluid supply lines 12 and 14 through hydraulic damping chambers 46 and 48, and orifices 50 and 52, respectively. Check valves at the pump inlets and outlets ensure one-way fluid flow. The accumulators 54 and 56 operate to absorb fluid pressure in lines 26 and 32 until the respective pumps 38 and 40 can return the fluid to the supply lines 12 and 14.

The various solenoid operated valves depicted in FIG. 1 are designed to operate as two-position mechanisms. The valves are spring biased to the positions shown, and move to the alternate position when the respective solenoid is fully energized with electric current. Thus, in the OFF or quiescent state, apply valves 18, 20, 22 and 24 permit fluid flow between the supply lines 12 and 14 and the respective brakes LR, RF, LF and RR through internal orifices sized to provide optimum braking of the vehicle under normal conditions. In the ON or energized state, the apply valves 18, 20, 22 and 24 close to interrupt fluid flow between the supply lines 12 and 14 and the respective brakes. Conversely, the OFF or quiescent state of release valves 28, 30, 34 and 36 interrupts fluid flow between the brakes and the respective release lines 26 and 32, while the ON or energized state permits fluid flow through internal orifices as shown.

In normal operation, the hydraulic pressure at the brakes is determined directly according to the supply pressure developed by boost unit 16, as modified by the internal orifices of the apply valves 18, 20, 22 and 24. The release valves 28, 30, 34 and 36 do not affect the brake pressure, and motor 42 is de-energized so that the pumps 38 and 40 are inactive.

In ABS operation, the motor 42 is turned on to drive the pumps 38 and 40, and one or more of the apply valves 18, 20, 22 and 24 are energized to interrupt fluid flow in the respective supply line 12 or 14, holding the brake pressure at its then-current value. However, the parallel connected check valves prevent the brake pressure from exceeding the respective pressure in supply line 12 or 14, in any event. If the ABS controller determines that the current brake pressure is too high, the release valve 28, 30, 34, 36 for the respective brake is momentarily energized to release the brake pressure into line 26 or 32, and the respective pump 38 or 40 returns the fluid to the supply line 12 or 14. When the lock-up condition is relieved, the respective release valve is de-energized, and the apply valve is energized in a manner to re-couple the brake to its respective supply line 12 or 14. It is this aspect—that is, the re-application of brake pressure—to which the current control method of this invention is directed.

Figure 2:
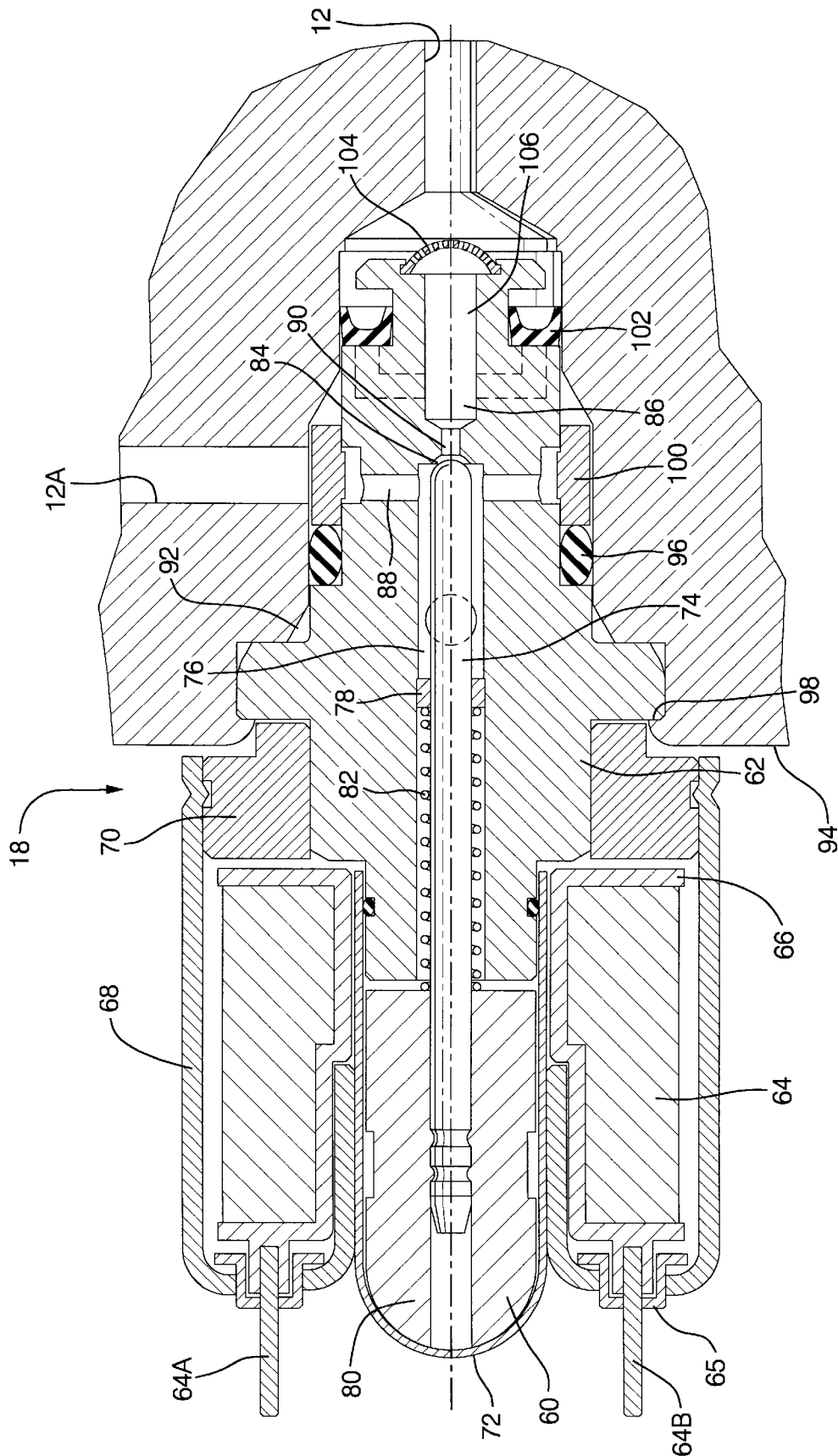
FIG. 2 is a cross-section view of a solenoid operated apply valve depicted in the hydraulic block diagram of FIG. 1.

FIG. 2 depicts a representative apply valve 18 in detail. Where applicable, the reference numerals used in FIG. 1 have been repeated to designate corresponding elements. Magnetically, the valve 18 has an armature 60, a stator 62 and a solenoid coil 64. The solenoid coil 64 is wound on bobbin 66 positioned within an outer metal housing 68 crimped onto a stator sealing element 70. The coil leads 64a and 64b protrude though an annular insulator 65 seated in the end of housing 68. A stainless steel tube 72 circumferentially welded onto stator 62 encases and operates as a stop for the armature 60. The valve pintle 74 is received slidingly within a central bore 76 of stator 62 on bushing 78, and is press-fit into a central bore 80 of armature 60 so that pintle 74 moves with armature 60. A spring 82 disposed between bushing 78 and armature 60 biases the armature 60 against the tube 72 as depicted in FIG. 2 to define the rest or quiescent position of the pintle 74. The free end of pintle 74 is disposed in proximity to a seat 84 formed in the central bore 76, normally permitting fluid flow between a supply-side passage 86 and a brake-side passage 88. The supply side passage 86 includes an orifice 90 corresponding to the orifice depicted in the valve schematic of FIG. 1. When the solenoid coil 64 is energized, the resulting magnetic field produces a magnetomotive force that opposes the spring and any hydraulic forces, and if strong enough, moves pintle 74 against its seat 84 to interrupt fluid flow between the passages 86 and 88. At assembly, the position of the pintle 74 within the armature bore 80 is controlled so that when the pintle 74 is fully seated, a small space remains between armature 60 and stator 62.

The stator 62 is seated in a recess 92 in an ABS valve body 94 such that supply-side passage 86 is placed in fluid communication with supply line 12, and brake-side passage 88 is placed in fluid communication with line 12a. A weld or deformation of the valve body metal against stator 62 as designated by reference numeral 98 secures the valve 18 in the valve body 94. An O-ring 96 seals the armature 62 against the valve body 94, and the fluid filters 100 and 102 are positioned on the armature 62 in the path of the internal passages 88 and 86. A lip seal 104 disposed in the end of passage 106 permits one-way fluid flow between the passage 106 and the supply line 12 in order to quickly return the brake pressure to a lower supply pressure under certain conditions.

As indicated above, a solenoid operated valve as depicted in FIG. 2 is designed to be operated in either the ON position interrupting fluid flow or the OFF position permitting fluid flow. During re-application of the brake pressure following a hold and/or release ABS operation, the valve is ordinarily operated to quickly open and close, producing a "stair-step" increase in the brake pressure for each opening of the valve. The resulting brake pressure is graphically depicted by trace A in FIG. 3. While this technique is adequate in terms of brake control, the consequent acceleration and deceleration of the brake fluid tends to produce "hammering" noise, as described above.

Figure 3:
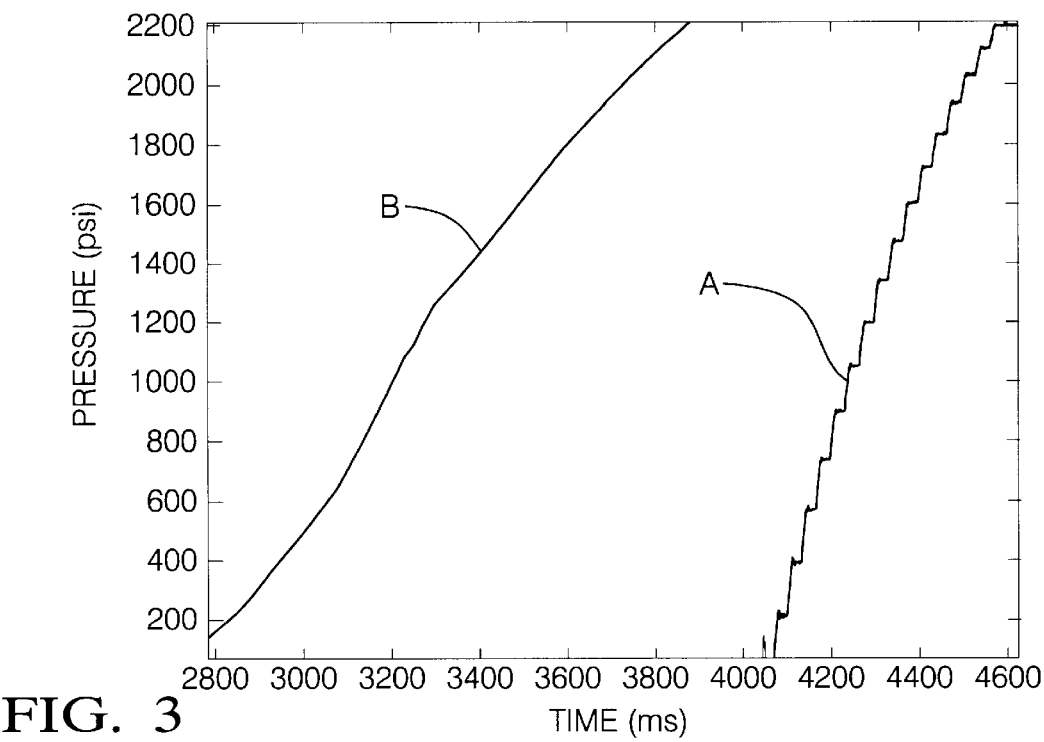
FIG. 3 graphically depicts brake pressure as a function of time during a re-apply interval for two different solenoid control techniques.

According to this invention, however, the brake pressure is re-applied through a cyclic current control technique that moves the valve to a succession of partially opened positions, thereby achieving a comparatively smooth increase in the brake pressure, as graphically depicted by trace B in FIG. 3. The succession of partially opened positions is defined by a succession or schedule of average current values to be supplied to the solenoid. The current values are influenced by the pressure differential across the valve, and a feedback mechanism in the algorithm periodically adjusts the scheduled current values in the course of the re-apply phase to produce the desired rate of pressure increase. The cyclic aspect of the control involves periodically energizing the solenoid in the course of the re-apply phase to substantially close the apply valve. The cyclic substantial closing of the valve serves to periodically return the valve to a known, stable position, thereby preventing instability of the valve due to the pressure and current fluctuations.

In the preferred embodiment, the current control is achieved through a relatively high frequency pulse-width-modulation (PWM) of the valve solenoid. The PWM serves not only to maintain the average current at the scheduled value, but also to slightly dither the valve body to prevent non-linear operation due to friction of the valve body within its bore. Other mechanizations, such as an open-loop or closed-loop linear current control, with or without a superimposed alternating dithering current, are also possible.

Figure 4A:
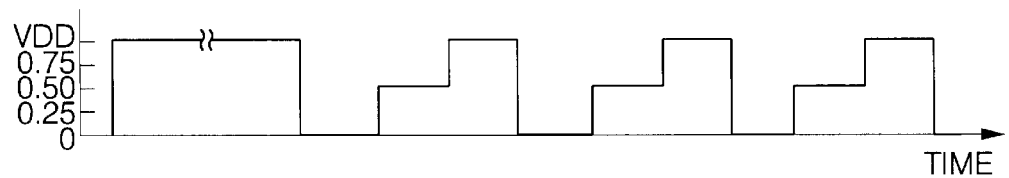
FIGS. 4A–4C together graphically depict the current control of this invention.
Figure 4B:
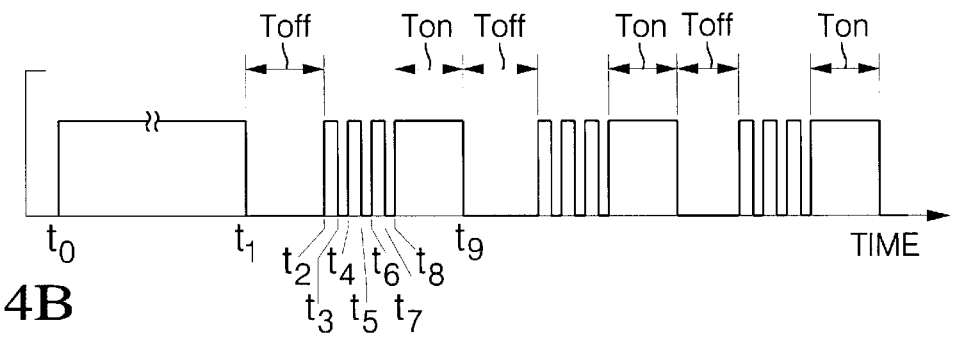
Figure 4C:
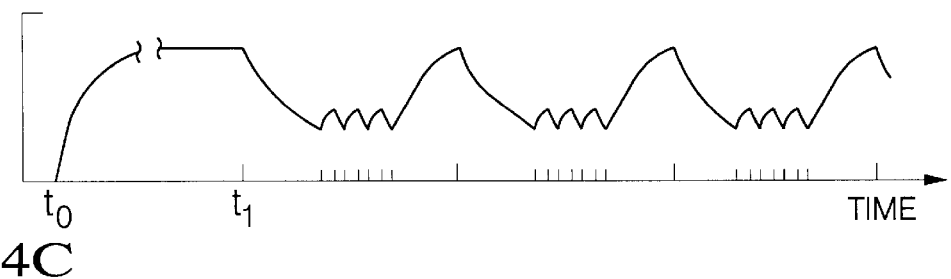

A graphical illustration of the control is set forth in FIGS. 4B–4C, which depict different traces on a common time base. FIG. 4B depicts the energization pattern for a respective apply valve solenoid and FIG. 4C depicts the solenoid current ISOL. FIG. 4A depicts an intermediate control signal (CM), described below in reference to FIGS. 5–6.

As indicated above, the brake re-apply phase is initiated following a hold/release phase (interval t0–t1) in which one or more of the apply solenoid valves 18–24 are continuously energized. In the hold/release phase, the respective pintles 74 are fully closed, and the respective release valves 28, 30, 34, 36 may be momentarily energized to partially release the applied brake pressures. The hold/release phase may be relatively lengthy compared to the ensuing PWM intervals, as indicated by the discontinuity in the interval t0–t1. At the commencement of the re-apply phase at time t1, the solenoid coil of the apply valve(s) is first de-energized for an OFF period Toff (interval t1–t2) chosen to allow the current ISOL to decrease from its steady-state value to the desired average current selected by the ABS algorithm. As explained above, the desired average current corresponds to a partially open valve position determined to provide a desired flow rate for building the brake pressure as designated by the trace B in FIG. 3. In the ensuing interval t2–t8, the solenoid is PWMed to maintain the average value of ISOL at the desired value, thereby controlling the valve pintle at the scheduled partially open position. In practice, the actual fluid flow rate for a given position of the valve varies with the pressure differential across the valve, and the algorithm adjusts the scheduled current values based on observed wheel speed behavior so that the desired rate of pressure increase can be achieved, as discussed below in reference to the flow diagram of FIG. 8. At time t8, the solenoid is re-energized for an ON period Ton (interval t8–t9) to return the pintle 74 to a closed or nearly closed position. At the end of the Ton period, the cycle is repeated by again de-energizing the solenoid coil 64 for an interval Toff chosen to allow the current ISOL to decrease to a new desired average current selected by the ABS algorithm. As above, this interval is followed by a PWM interval, and then by a Ton interval, and so on for the remainder of the re-apply phase.

Figure 5:
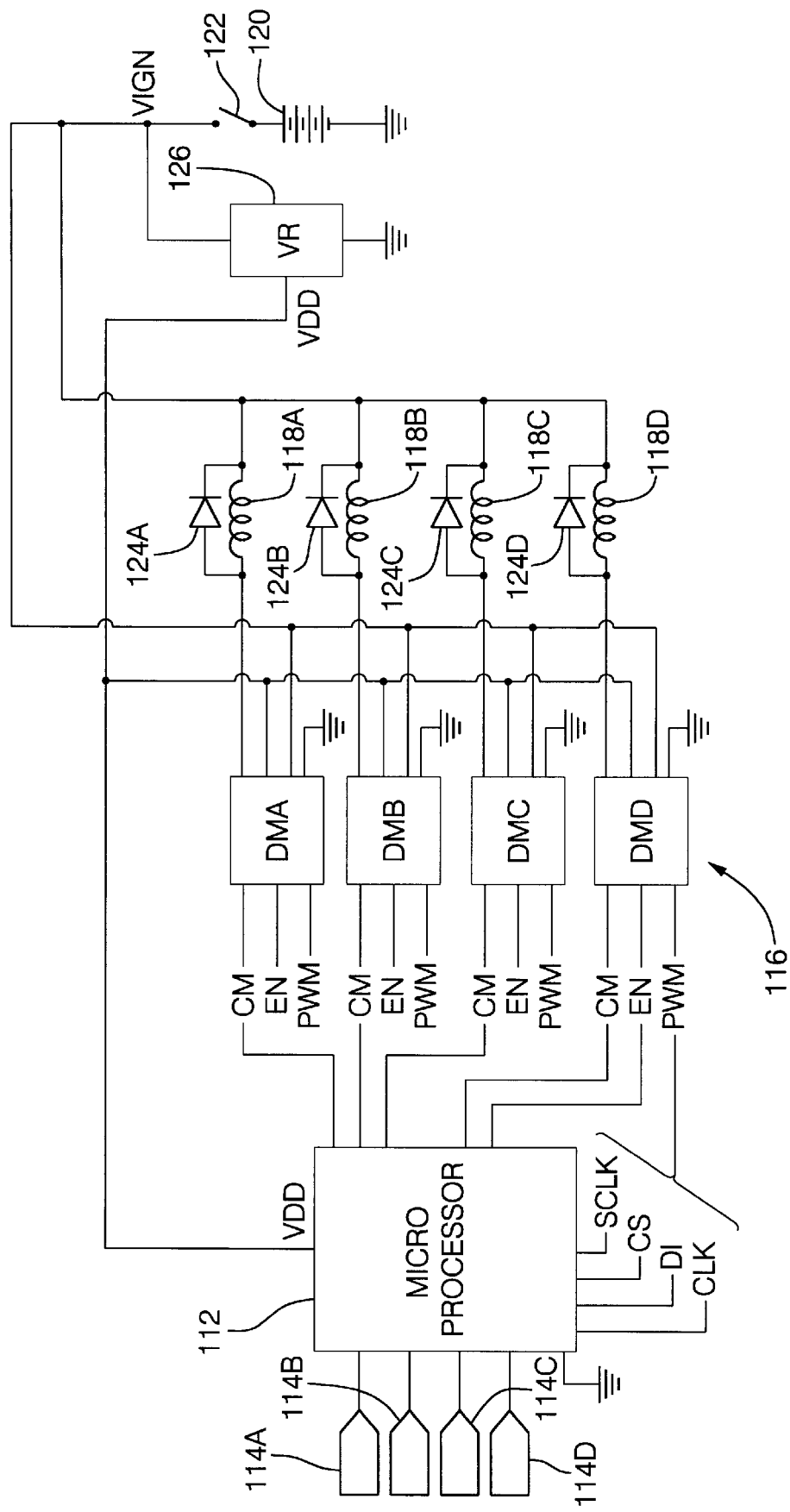
FIG. 5 is an electrical block diagram of a controller for regulating the operation of the ABS system of FIG. 1, including a microprocessor and an external circuit interfacing the microprocessor to the solenoid operated valves of the ABS system.

FIG. 5 depicts a circuit diagram of an electrical controller for regulating the operation of the ABS system of FIG. 1 as described above. The solenoid coils 118A–118D for each of the apply valves 18, 20, 22 and 24 are selectively energized under the control of a microprocessor (MP) 112. In carrying out the control, the microprocessor 112 executes an ABS algorithm, the principle inputs for which are wheel speed signals obtained from four wheel speed sensors 114–114D. When the algorithm detects an incipient wheel slip condition, the microprocessor 112 signals driver circuitry, generally designated by the reference numeral 116, and comprising driver modules DMA, DMB, DMC and DMD, to energize one or more of the solenoid coils 118A–118D as described above. One terminal of each of the solenoid coils 118A–118D is connected to the positive terminal of a storage battery 120 via conventional ignition switch 122, and the other respective terminals are selectively connected to the negative terminal, or ground, by an associated driver module. Free-wheeling diodes 124A–124D connected in parallel with each of the solenoid coils 118A–118D to slowly re-circulate inductive energy stored in the respective coils when the associated driver module interrupts the ground connection to de-energize the coil.

The storage battery voltage VIGN is supplied to each of the driver modules DMA, DMB, DMC and DMD, and a lower logic-level voltage VDD developed by voltage regulator (VR) 126 is supplied to both the microprocessor 112 and the driver modules DMA, DMB, DMC and DMD. The inputs supplied to driver modules DMA, DMB, DMC and DMD by microprocessor 112 include a control mode signal (CM), an enable signal (EN) and PWM control signals (PWM). As indicated in respect to driver module DMD, the PWM control signals include a serial-clock signal (SCLK), a chip select signal (CS), a data input signal (DI) and a high frequency clock signal (CLK). These signals are discussed in further detail below in reference to FIG. 6, which depicts a block diagram of exemplary driver module DMD, with like reference numerals designating like elements where possible.

Figure 6:
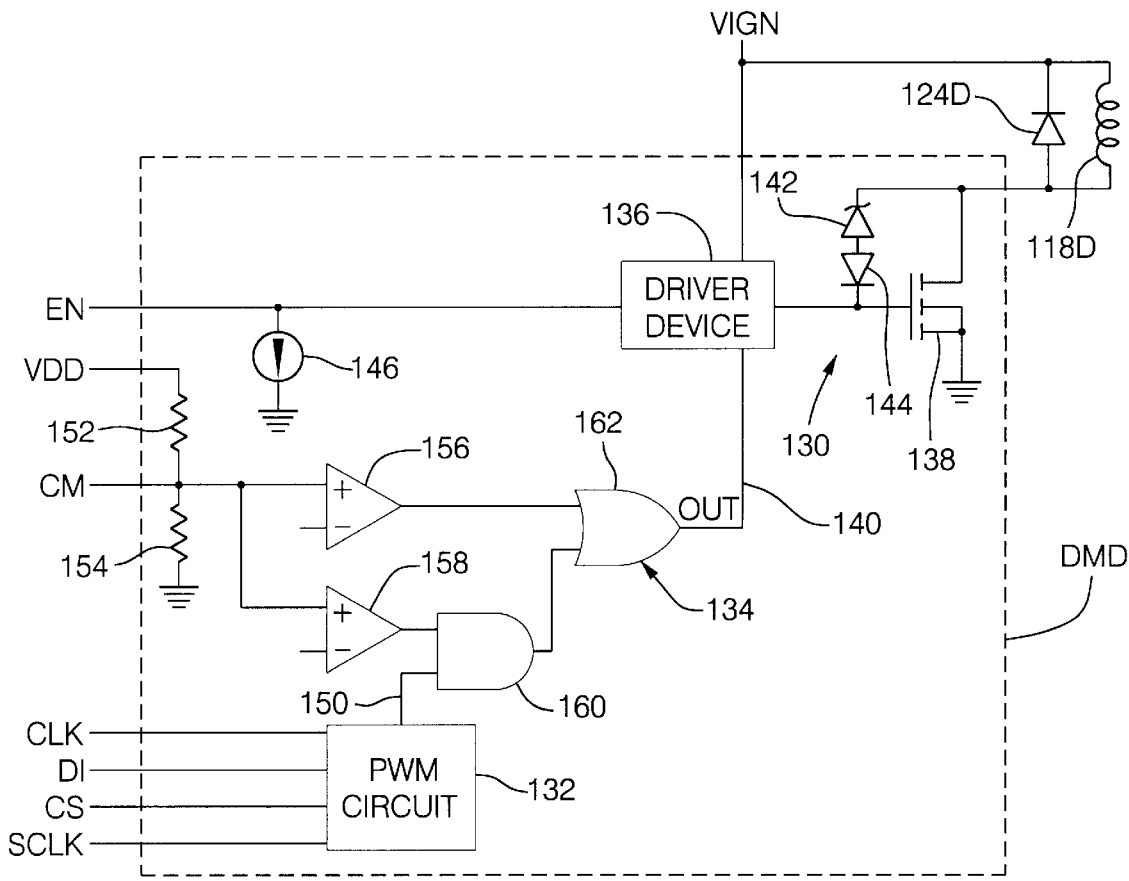
FIG. 6 is a block diagram of the external circuit of FIG. 5, depicting a PWM circuit, a logic circuit and a solenoid driver circuit.

Referring to FIG. 6, the driver module DMD comprises an output driver circuit, generally designated by the reference numeral 130, a PWM circuit 132 and a logic circuit, generally designated by the reference numeral 134. The output driver circuit 130 includes a driver device 136 which operates, when enabled by enable signal EN, to bias power transistor 138 on and off in accordance with the logic level of the logic circuit output (OUT) on line 140. The series combination of zener diode 142 and diode 144 in the drain-to-gate circuit of transistor 138 provide a controlled turn-off of the transistor so as to limit the inductive voltage when solenoid coil 118D is de-energized in the event that diode 124D fails to a open-circuit state. The driver device 136 may be of conventional design and is not illustrated in detail. The current source 146 ensures that the driver device 136 is maintained in a disabled state in the absence of an enable signal EN from microprocessor 112.

The PWM circuit 132 may be a conventional digital PWM circuit having a pair of internal registers which are periodically updated by microprocessor 112 with frequency and duty cycle information for the PWM interval of the subject current control method. The data is supplied serially via the data input (DI) line, and clocked into the internal registers of PWM circuit 132 via clock pulses provided on the serial-clock (SCLK) line. The data stored in the registers represents a number of clock pulses or counts of the high frequency clock (CLK) line. Whenever enabled by the chip select (CS) line, the PWM circuit 132 provides a digital output, such as illustrated in the interval t2–t8 of FIG. 4B, on its output line 150. In the illustrated embodiment, each driver module has a similar PWM circuit, and the microprocessor 112 periodically updates the high frequency information stored in each circuit, per dictate of the ABS algorithm.

The logic circuit 134 receives the tri-state control mode signal (CM) from microprocessor 112, and the digital output of PWM circuit 132 on line 150. A pair of equal value resistors 152 and 154 bias the normal or open-circuit voltage of the control mode signal to the mid-point of the logic level voltage VDD. The microprocessor 112, which operates on the logic level voltage, can selectively (1) drive the control mode signal to a high logic level, over-powering resistor 154, (2) drive the control mode signal to a low logic level, over-powering resistor 152, or (3) present a high impedance, allowing the resistors 152 and 154 to maintain the control mode signal voltage at 0.5 VDD.

The control mode signal is applied to the non-inverting inputs of comparators 156 and 158. A reference voltage of 0.75 VDD is applied to the inverting input of comparator 156, and a reference voltage of 0.25 VDD is applied to the inverting input of comparator 158. The output of comparator 158 and the digital output of PWM circuit 132 are applied as inputs to AND-gate 160, and the outputs of AND-gate 160 and comparator 156 are applied as inputs to OR-gate 162 to form the output signal OUT on line 140.

When an apply valve solenoid is to be de-energized, the microprocessor 112 drives the tri-state control mode signal (CM) to a low logic level, below the reference of 0.25 VDD. In this case, the outputs of both comparators 156 and 158 are low, blocking the PWM pulses on line 150 and forcing the output signal (OUT) on line 140 to a low logic level, de-energizing solenoid coil 18D. When an apply valve solenoid is to be energized, the microprocessor 112 drives the control mode signal (CM) to a high logic level, above the reference of 0.75 VDD. In this case, the output of comparator 156 is high, forcing the output signal (OUT) on line 140 to a high logic level, energizing solenoid coil 118D. When the apply valve solenoid is to be PWMed in the course of the re-apply phase, the microprocessor 112 drives its control mode output (CM) to a high impedance state, allowing the resistors 152 and 154 to bias the voltage on the control mode line to 0.50 VDD, intermediate the reference voltages of 0.25 VDD and 0.75 VDD. In this case, the output of comparator 156 is low, and the output of comparator 158 is high, allowing the digital output of PWM circuit 132 to pass through both AND-gate 160 and OR-gate 162 to the output signal (OUT) line 140. Thus, the logic circuit 134 works in concert with the tri-state control mode output of microprocessor 112 to control solenoid energization in accordance with the control mode signal itself when the apply valve solenoid is to be energized or de-energized, and to control the solenoid energization in accordance with the output of the PWM circuit 132 when the apply valve solenoid is to be PWMed.

FIGS. 4A and 4B graphically depict the above described circuit operation in respect to the control method of this invention. FIG. 4A depicts the control mode voltage CM, while FIG. 4B depicts the output signal OUT. In the ON intervals of the solenoid (as in intervals t0–t1 and t8–t9) the control mode signal (CM) is driven to a high logic level (VDD), resulting in a continuous drive signal (OUT) for the power transistor 138. In the OFF intervals of the solenoid (as in interval t1–t2) the control mode signal (CM) is driven to a logic zero level (0), removing the drive signal (OUT) from transistor 138. In the PWM intervals (as in interval t2–t8) the microprocessor's control mode output assumes a high impedance state, allowing the resistors 152 and 154 to bias the control mode voltage to an offset value (0.50 VDD), resulting in a PWM drive signal (OUT) for the transistor 138.

Figure 8:
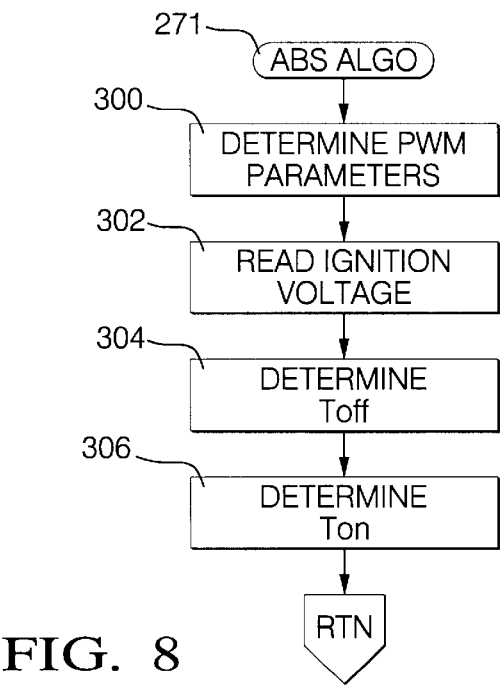
FIGS. 7–8 are high level flow diagrams representing computer program instructions executed by the microprocessor of FIG. 5 according to this invention.
Figure 7:
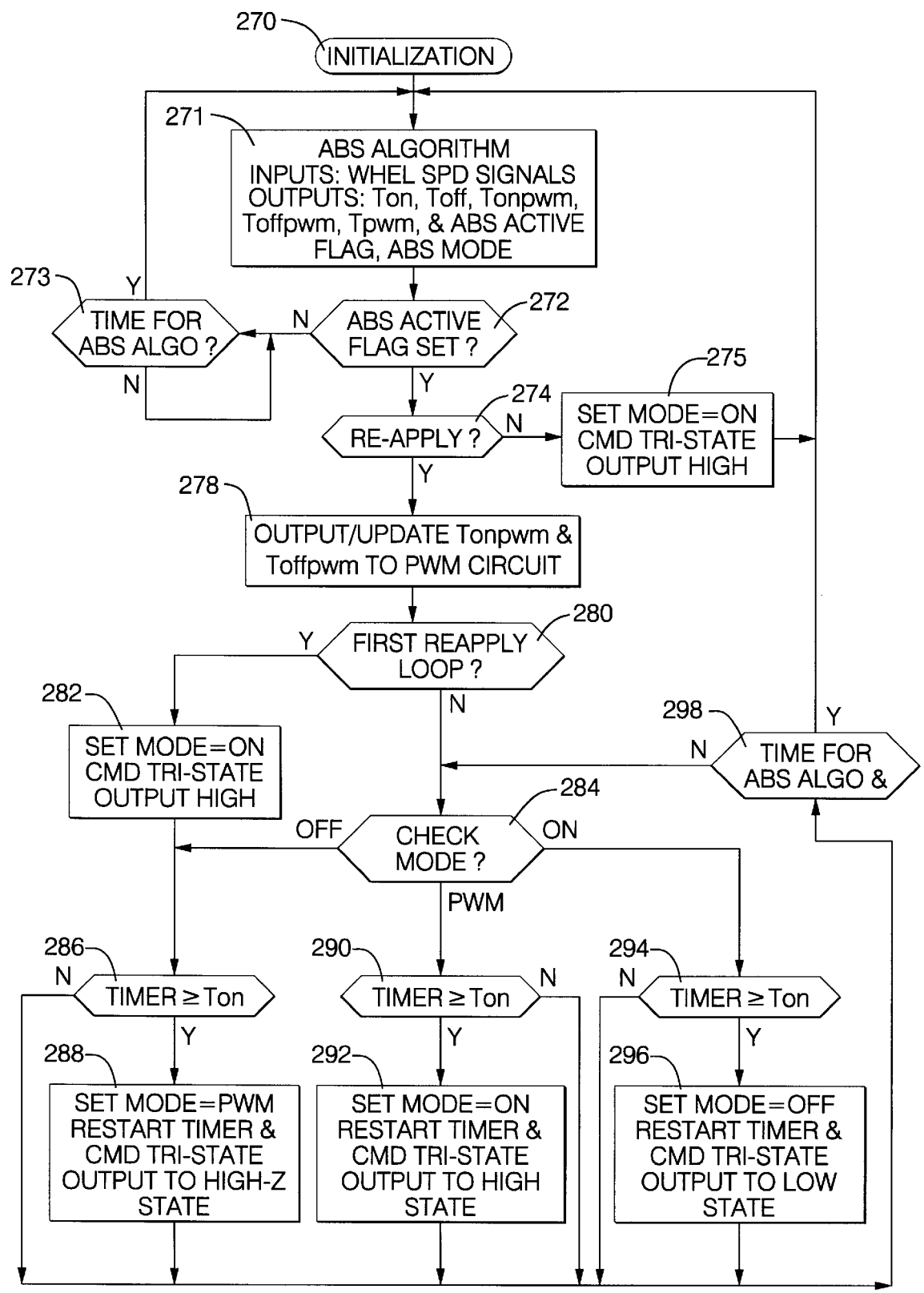

FIGS. 7–8 depict simplified flow diagrams representative of computer program instructions executed by microprocessor 112 in carrying out the subject control. FIG. 7 depicts a main or executive flow diagram, while FIG. 8 depicts a portion of the ABS algorithm in more detail, as it pertains to the current control method of this invention.

Referring to FIG. 7, the block 270 designates a set of instructions for initializing the various parameters and variables at start-up, enabling the driver modules, and performing self-testing to ensure reliable operation of the system. After initialization, the block 271 is executed to carry out the main ABS algorithm, described in further detail below in reference to the flow diagram of FIG. 8. In general, the ABS algorithm reads and analyzes the wheel speed data from sensors 114A–114D to detect the onset of wheel slip, sets or clears an ABS ACTIVE FLAG to indicate whether the ABS system is to be activated, determines the appropriate ABS phase (HOLD, RELEASE or RE-APPLY), and generates suitable energization commands for the solenoid coils 118A–118D. During the RE-APPLY phase, the ABS algorithm outputs include, for each solenoid coil 118A–118d, the on and off times (Ton and Toff), the duration of the PWM interval (Tpwm), and the PWM on and off times (Tonpwm and Toffpwm). The times Ton and Toff are graphically defined in FIG. 4B; the time Tpwm corresponds to an interval such as t2–t8, the time Tonpwm corresponds to an interval such as t2–t3, and the time Toffpwm corresponds to an interval such as t3–t4.

Prior to the onset of wheel slip, the ABS mode is considered to be inactive, as determined at block 272, and block 273 is executed to determine if it is time to re-execute the ABS algorithm. Typically, automotive controllers are designed to so that algorithms such as the ABS algorithm are executed on a periodic basis, such as once every 100 μsec. At the appropriate time, block 273 is answered in the affirmative, and the ABS algorithm is re-executed.

Once the ABS algorithm sets the ABS flag to indicate that the ABS mode is active, the block 274 is executed to check the ABS mode. Initially, the HOLD or RELEASE phase will be activated, and the block 275 is executed to set a control mode indicator (MODE) to ON and to command the respective tri-state output to its HIGH state, completing the program loop. When the RE-APPLY phase is activated, block 274 is answered in the affirmative, and the blocks 278–296 are executed to output or update the high frequency on and off times Tonpwm and Toffpwm to the various PWM circuits 132 (block 278), and for any solenoid for which ABS is active, to control the logic level of the respective tri-state outputs, and hence the control mode signals (blocks 280–296). After each loop, the block 298 is executed to determine if it is time to re-execute the ABS algorithm. If so, the microprocessor 112 is returned to block 271, as described above. If not, the microprocessor 112 is directed to block 284 to re-execute the tri-state output control portion of the flow diagram.

In the first program loop after the RE-APPLY phase is activated, as determined at block 280, the block 282 is executed to set a control mode indicator (MODE) to OFF, to start a timer or counter (TIMER), and to command the respective tri-state output to its LOW state. In subsequent executions of the program loop during the RE-APPLY phase, block 280 will be answered in the negative, and block 284 will be executed to determine the state of the MODE indicator. Initially, the MODE indicator will be OFF, and the block 286 is executed to determine if the TIMER has reached Toff. If not, the block 298 is executed as described above to determine if it is time to re-execute the ABS algorithm. If block 286 is answered in the affirmative, block 288 is executed to set the MODE indicator to PWM, to restart the TIMER, and to command the respective tri-state output to its high impedance (HIGH Z) state. In a subsequent execution of the program loop when block 284 determines that the MODE indicator is PWM, the block the block 290 is executed to determine if the TIMER has reached Tpwm. If not, the block 298 is executed as described above to determine if it is time to re-execute the ABS algorithm. If block 290 is answered in the affirmative, block 292 is executed to set the MODE indicator to ON, to restart the TIMER, and to command the respective tri-state output to its HIGH state. In a subsequent execution of the program loop when block 284 determines that the MODE indicator is ON, the block the block 294 is executed to determine if the TIMER has reached Ton. If not, the block 298 is executed as described above to determine if it is time to re-execute the ABS algorithm. If block 294 is answered in the affirmative, block 296 is executed to set the MODE indicator back to OFF, to restart the TIMER, and to command the respective tri-state output back to its LOW state.

The flow diagram of FIG. 8 depicts a portion of the ABS algorithm that is executed by microprocessor 112 during the RE-APPLY phase. Prior to the RE-APPLY phase, the algorithm determines a desired average current for each apply valve solenoid. The desired average current is selected (by calculation or table look-up) to achieve a desired position of the respective apply valve pintle, which in turn, corresponds to a desired flow rate for achieving a pressure re-apply of the type illustrated by trace B in FIG. 3. Various factors are involved in determining the desired flow rate, such as the severity of the lock-up condition, the degree of brake pressure release, sensed ambient conditions, etc. Moreover, the pintle position for achieving a given flow rate varies as a function of the pressure differential across the valve, which also must be estimated. However, given a desired average current, the block 300 is executed to determine the corresponding PWM parameters, including Tonpwm, Toffpwm and Tpwm. The parameters Tonpwm and Toffpwm are determined as a function of known valve performance characteristics, and the parameter Tpwm is empirically determined to ensure stability. Then the blocks 302 and 304 are executed to read the system supply voltage and to determine the initial off time Toff, As indicated above, Toff is chosen to allow the solenoid current to decay from its steady state value to the desired average current selected by the ABS algorithm, and is therefore dependent to a degree on the supply voltage. Finally, the block 306 is executed to determine Ton, the time required to return the solenoid current from the desired average current substantially to its steady state value for bringing the pintle to a closed or nearly closed position.

The above-described steps are periodically repeated in synchronism with the rest of the ABS algorithm so that output of the algorithm is a series of time parameters that correspond, in effect, to a flow rate for achieving an appropriate re-application of the brake pressure. To the extent that the underlying parameters are inaccurately estimated, the rate of increase in brake pressure will result in sub-optimal braking condition which is detected by the algorithm, and used to adjust the desired solenoid current in a corrective direction. Such an overall control is enabled by the control method of this invention, which achieves a linearized control of fluid flow with the above-described cyclic current control method.

While this invention has been described in reference to the illustrated embodiment, it is expected that various modifications in addition to those suggested above will occur to those skilled in the art. In this regard, it will be understood that the scope of this invention is not limited to the illustrated embodiment, and that systems incorporating such modifications may fall within the scope of this invention, which is defined by the appended claims.

The embodiments of the invention in which an exclusive property or privilege in claimed are defined as follows:

1. A method of operation for an automotive anti-lock braking system in which an electrically controlled solenoid valve in a hydraulic line coupling a master cylinder to a braking device is electrically activated to a first position to permit unimpeded fluid flow in said hydraulic line or a second position to interrupt fluid flow in said hydraulic line, the method comprising the steps of:

energizing the solenoid to move the valve to the second position to interrupt fluid flow in said hydraulic line;

de-energizing the solenoid for a first interval that allows its current to decay to a scheduled value for moving the valve to a desired position intermediate said first and second positions;

maintaining the solenoid current at said scheduled value for a second interval to maintain said valve at said desired position;

re-energizing said solenoid for a third interval that allows the solenoid current to return to a steady state value, thereby substantially returning said valve to said second position; and repeating said de-energizing, maintaining, and re-energizing steps with successively lower scheduled current values to gradually re-establish unimpeded fluid flow in said hydraulic line.

2. The method of operation defined in claim 1, wherein the step of maintaining the solenoid current comprises the step of:

repeatedly energizing and de-energizing said solenoid at a frequency too high to substantially change the position of said valve, and at duty cycle chosen to maintain the solenoid current at said scheduled value.

3. The method of operation defined in claim 2, wherein said second interval has a duration sufficiently short to maintain stable control of said valve position.

4. The method of operation defined in claim 1, wherein said successively lower scheduled current values correspond to a succession of desired positions intermediate said first and second positions.

5. The method of operation defined in claim 1, wherein the re-energizing of said solenoid for said third interval returns said valve substantially to said second position.

6. A method of operation for an automotive anti-lock braking system in which an electrically energizable fluid valve in a hydraulic line coupling a master cylinder to a braking device has an armature which is biased to an open position when the valve is de-energized to permit unimpeded fluid flow in said hydraulic line and to a closed position when the valve is energized with current to interrupt fluid flow in said hydraulic line, the method comprising the steps of:

energizing the valve with current to move the armature to the closed position to interrupt fluid flow in said hydraulic line;

de-energizing the valve for a first interval that allows said current to decay to a scheduled value for retracting the armature to a desired position intermediate said open and closed positions;

rapidly energizing and de-energizing said valve to maintain said current at said scheduled value for a second interval, thereby to maintain said armature at said desired position;

re-energizing said valve for a third interval that allows said current to return to a steady state value, thereby substantially returning said armature to said closed position to substantially interrupt fluid flow in said hydraulic line; and repeating said de-energizing, maintaining, and re-energizing steps with successively lower scheduled current values to gradually re-establish unimpeded fluid flow in said hydraulic line.

7. The method of operation defined in claim 6, wherein said second interval has a duration sufficiently short to maintain stable control of said valve position.

8. The method of operation defined in claim 6, wherein said successively lower scheduled current values correspond to a succession of desired positions intermediate said open and closed positions.

9. A method of operation for an automotive anti-lock braking system in which an electrically energizable fluid valve in a hydraulic line coupling a master cylinder to a braking device has an armature which is biased to an open position when the valve is de-energized to permit unimpeded fluid flow in said hydraulic line and to a closed position when the valve is energized with current to interrupt fluid flow in said hydraulic line, the method comprising the steps of:

pulse-width-modulating said valve for a first interval to maintain its current at a current command value which moves the armature to a desired position intermediate said open and closed positions, thereby establishing a desired fluid flow rate in said hydraulic line;

energizing said valve for a second interval to increase said current to a steady state value, thereby moving said armature substantially to said closed position to substantially interrupt fluid flow in said hydraulic line;

de-energizing the valve for a third interval that allows said current to decay to said current command value for returning the armature to said desired position, thereby re-establishing said desired fluid flow rate; and repeating said pulse-width-modulating, energizing, and de-energizing steps with successively lower current command values corresponding to successively higher fluid flow rates to gradually re-establish unimpeded fluid flow in said hydraulic line.

10. The method of operation defined in claim 9, wherein said first interval has a duration sufficiently short to maintain stable control of said armature position.

* * * * *